April 14, 1925.  
J. E. COCHRAN  
1,533,830  
MEANS FOR MOLDING MONUMENTS AND THE LIKE FROM PLASTIC MATERIAL  
Filed Sept. 17, 1924  
3 Sheets-Sheet 1
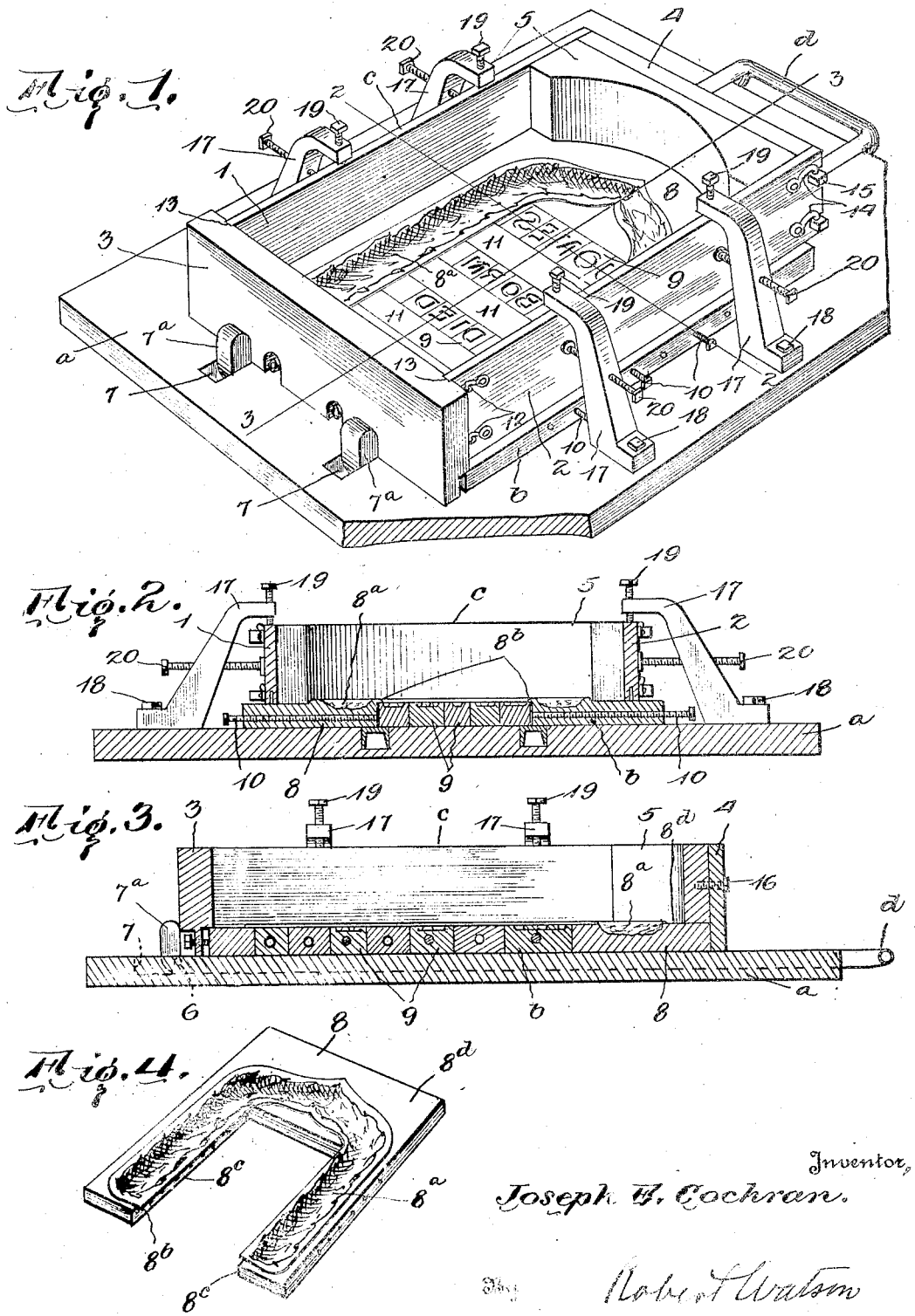
Inventor,  
Joseph E. Cochran.  
By Robert F. Watson  
Attorney

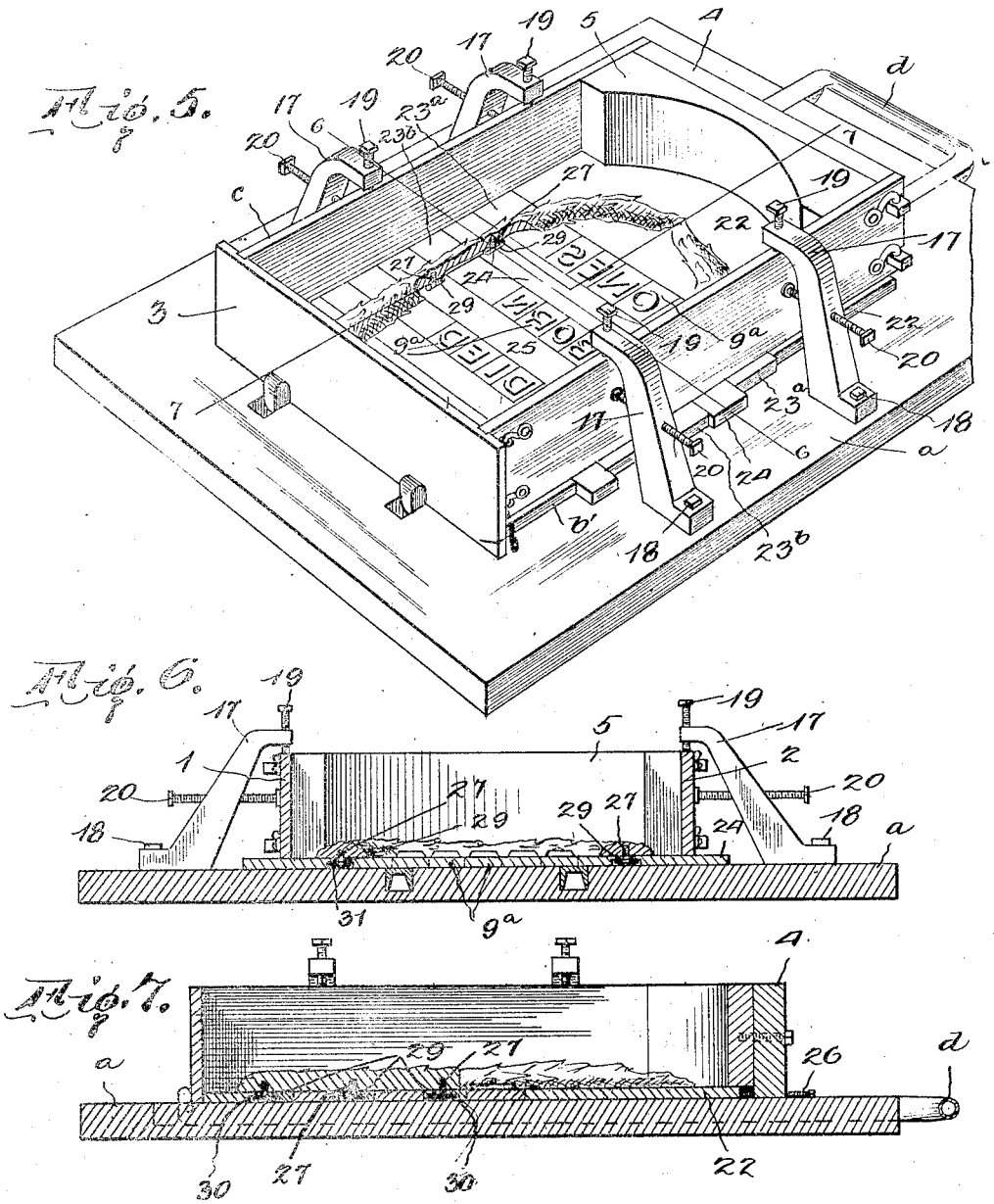

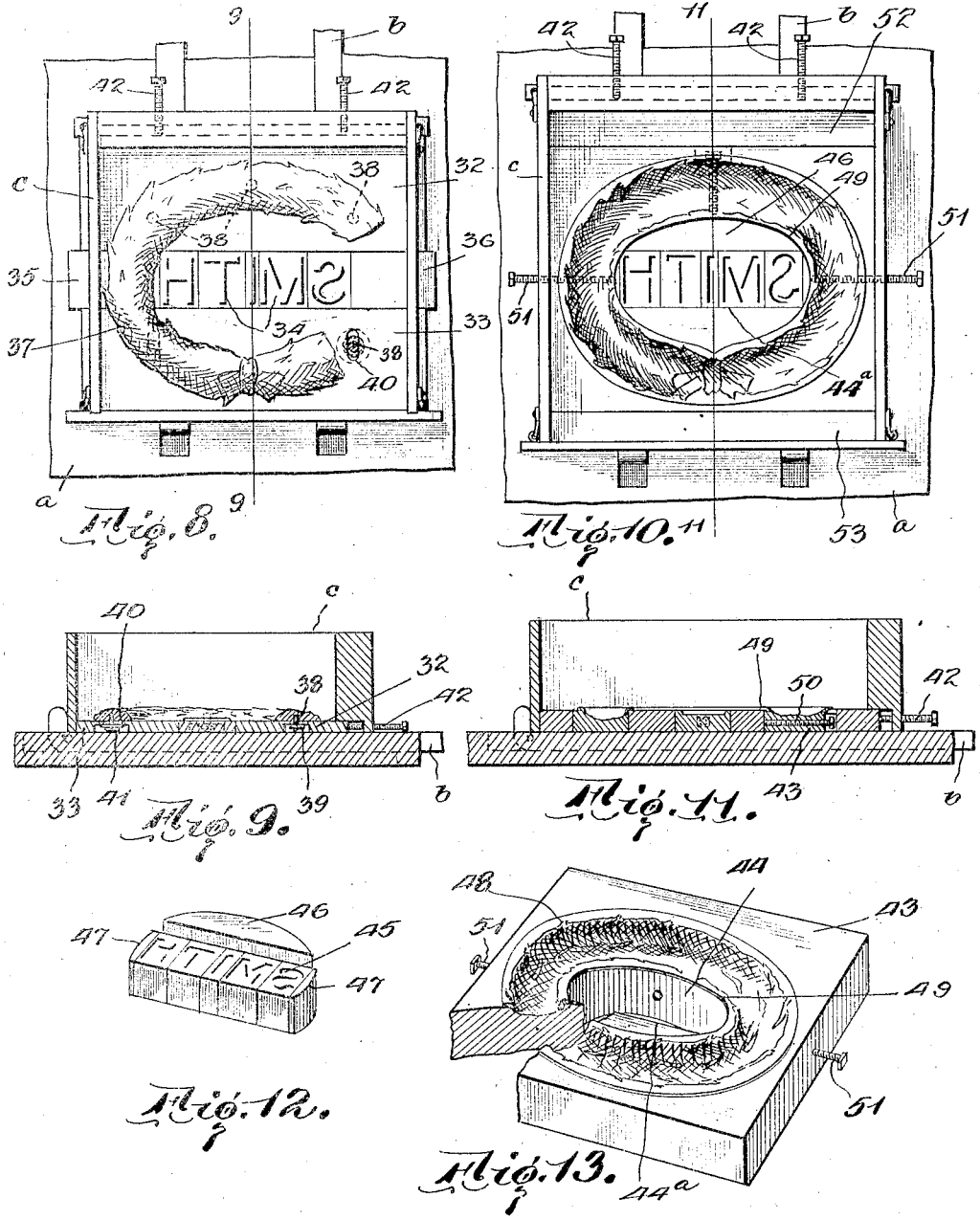

Patented Apr. 14, 1925.

1,533,830

UNITED STATES PATENT OFFICE.

JOSEPH E. COCHRAN, OF CHICAGO, ILLINOIS, ASSIGNOR OF ONE-HALF TO ELLIS T. CRAWFORD, OF CHARLESTON, WEST VIRGINIA.

MEANS FOR MOLDING MONUMENTS AND THE LIKE FROM PLASTIC MATERIAL.

Application filed September 17, 1924. Serial No. 738,181.

*To all whom it may concern:*

Be it known that I, JOSEPH E. COCHRAN, a citizen of the United States, residing at Chicago, in the county of Cook and State of Illinois, having invented certain new and useful Improvements in Means for Molding Monuments and the like from Plastic Material, of which the following is a specification.

This invention relates to means for molding monuments and the like from plastic material. The invention comprises a flat base plate for supporting the mold, a bottom plate composed of type molds and spacing members and an ornamental member which extends at the sides of the type members and may partially or completely close the same, these molds and members being separable, so that the type may be changed, as desired, and various ornamental designs may be employed. The mold also comprises side pieces which rest upon the bottom plate and end pieces which are detachably connected to the side pieces, and within the mold formed by the side and end pieces and the bottom plate is preferably placed a head piece to form the top of the monument. When the plastic material is placed in the mold, the type and ornamental design on the bottom plate form printed characters and an ornamental design or border on the face of the monument, either in intaglio or in relief, according to the design of the type and of the ornamental impression member. After the plastic material has been tamped into the mold a top plate or cover is secured to the side and end pieces and the mold and the plastic monument contained therein is then raised to an upright position by a lever which is hinged to the base plate and extends beneath the composite bottom plate of the mold, and which normally lies below or flush with the upper surface of the base plate. After the mold has been raised to the upright position, it is inverted and removed from the base plate. After its removal from the base plate, the composite bottom plate of the mold, which includes the type and ornamental design and spacing members, may be stripped from the monument, and the face of the monument, bearing the impressions of the type and ornamental designs, will then be exposed to the air so that it may dry and become set. The monument remains encased in the side and end boards and the part that was the top plate of the mold, until it has set sufficiently to be handled, when these parts of the mold may be removed for further use. In the meantime, the parts composing the bottom plate, including the ornamental design, may be replaced on the base plate of the mold, with other side and end pieces, and with such changes in the type as may be desired another monument may be molded. Thus the parts composing the bottom plate, which are the most expensive parts of the mold, may be used over and over while the monuments are drying, encased in other mold parts.

In the accompanying drawing:

Figure 1 is a top perspective view of a mold embodying my improvements, the type and ornamental molds being designed for forming printed characters and an ornamental border in relief upon the mold and monument;

Fig. 2 is a section on the line 2—2 of Fig. 1;

Fig. 3 is a section on the line 3—3 of Fig. 1;

Fig. 4 is a perspective view of the ornamental mold part of the bottom plate of the mold;

Fig. 5 is a perspective view of a mold for forming printed characters and an ornamental border in intaglio in the monument;

Fig. 6 is a section on the line 6—6 of Fig. 5;

Fig. 7 is a section on the line 7—7 of Fig. 5;

Fig. 8 is a plan view of a molding device showing a modified form of mold for molding designs and printed characters in intaglio;

Fig. 9 is a section on the line 9—9 of Fig. 8;

Fig. 10 is a plan view of a modified form of mold for molding designs and printed characters in relief;

Fig. 11 is a section on the line 11—11 of Fig. 10;

Fig. 12 is a perspective view of the type and spacing members shown in Fig. 10; and Fig. 13 is a perspective view, partly broken away, of the ornamental mold board of the mold shown in Fig. 10.

Referring to Figs. 1 to 4 inclusive of the drawing a indicates a flat plate constituting the base plate of the mold; b indicates a composite bottom plate for forming characters and designs on the front side of the monument and above this bottom plate is arranged a frame c comprising side pieces 1 and 2 which rest upon the bottom plate and end pieces 3 and 4 which are detachably secured to the side pieces. Within the frame c is a head piece 5 designed to give a suitable form to the top of the monument. A lever d, shown in the form of a bail, is pivoted at 6 and lies in grooves 7 extending longitudinally of the base, so that the bail lies flush with or below the surface of the base plate and the bottom plate is adapted to lie directly upon the base plate and above the lever as shown in the drawing. The ends of the yoke or lever are upwardly turned as shown at 7ª and project above the surface of the base or bed plate. The bottom plate in the figures referred to is composed of a U-shaped mold part 8, shown separately in Fig. 4, this mold part having on its upper surface an ornamental U-shaped design 8ª and having flanges 8ᵇ which project toward one another from its inner walls 8ᶜ. Between these walls are arranged type molds 9 having suitable letters or characters thereon and the top surface 8ᵈ of the part 8 is flush with the upper surfaces of these type molds. These type molds are arranged between the sides 8ᵉ of the ornamental mold part, to form words or numbers and these type molds are held together by screws 10 which extend through openings in the ornamental member and bear against the type molds as shown in Fig. 2. The lips or flanges 8ᵇ upon the ornamental design slightly overlap the upper surfaces of the type molds, as shown in Fig. 2, so as to prevent plastic material from entering the spaces between the type molds and the ornamental mold part. This avoids the necessity of having the type molds fit close against the inner sides 8ᵉ of the ornamental part. Spacing blocks or members 11 are arranged between the rows of type molds to space the lines of print apart and the ends of these spacing members also project under the flanges 8ᵇ of the ornamental mold.

The side pieces 1 of the mold rest directly upon the top of the ornamental mold part, at the outer sides of the ornamental design, as shown in the drawing, and make a tight fitting joint therewith. The end piece 3 is detachably connected to the side pieces by means of latches 12, and preferably the side pieces extend into mortices 13 in said end pieces. The end piece 3 does not rest upon the bottom piece, but extends downwardly to the base plate as shown, so that when the mold is raised to the vertical position, the bottom piece will be supported by the end piece 3. The end piece 4 is also detachably connected to the side pieces by suitable means such as the latches 14 which extend through tongues 15 which latter project from the end of the end piece 4 through slots in the side pieces, as shown. The head piece 5 rests upon the flat upper surface of the ornamental mold part 8 and it is suitably secured to the end piece 4 as by the screw 16. The upper surface of the head piece lies flush with the upper surface of the side and end pieces.

For the purpose of holding the frame c firmly against the bottom piece, brackets 17 are provided and these are secured to the base by suitable means such as bolts 18. The brackets project over the side pieces and clamping screws 19 are provided in the brackets, these screws being adapted to bear upon the upper edges of the side pieces and force the side pieces firmly against the bottom plate. The brackets 17 may be swung out of the way when the mold is to be moved by loosening the bolts 18. To prevent any bulging of the side pieces, screws 20, extending through the brackets, may be pressed against the side pieces.

In operating the mold shown in Figs. 1 to 3, the composite bottom piece or plate b is put together and then laid upon the base plate over the lever, and the side and end pieces are placed in position, the end piece 3 abutting against the up-turned projections 7ª of the bail or lever. The plastic material is then placed in the mold and suitably tamped and made flush with the upper surface of the frame c and a cover or top piece is then placed over the upper edges of the mold and suitably secured to the side and end pieces. Assuming the plastic material to be partly set, or of such nature that it will not flow when tamped in the mold, after the top plate has been applied to the mold, the latter may be raised to its vertical position by lifting upwardly on the bail d which bail will support and prevent displacement of the composite bottom plate while the mold is being moved to the upright position. By rocking the bail through an angle of 90° the feet of the bail are rocked downwardly into the slots of the base piece and this will leave the mold and monument standing on the base piece, the end 3 of the mold resting directly upon the base piece. The mold is then tilted further so that it will be inverted. It then can be taken from the base piece to a suitable drying room where the composite bottom piece can be removed, leaving the face of the monument exposed to the air for drying. After a suitable interval, when the monument has become firm enough to handle, the end and side pieces may be also removed.

As soon as the composite bottom piece has been removed it may be used again in connection with other side and end pieces for molding another monument, suitable changes in the type molds being made, if desired.

In Figs. 5 to 8 inclusive of the drawing the base piece $a$, frame $c$ and bail or lever $d$ are the same as in the previously described figures and the head piece 5 is also the same. In these figures, however, the type molds $9^a$ are raised characters adapted to mold letters in intaglio in the monument and the ornamental design or border piece 21 is also designed to produce an ornamental depression in the monument extending around the printed characters. The bottom piece $b'$ is therefore different from the bottom piece in the figures first described. In Figs. 5 to 7, the bottom piece comprises a series of boards of suitable widths and each preferably slightly greater in length than the width of the mold so that the ends will project beyond the sides of the mold. Thus the bottom piece in Fig. 5 is shown as comprising a wide board or plate 22 next to which are arranged type molds $9^a$, composing a word, as the name of an individual, and these type molds are held in place by blocks $23^a$ which bear against the ends of the type molds and hold them together. Next to this series of type molds is a spacing member 24 consisting of a board which extends entirely across the mold and then follows a series of type molds which are held between the spacing member 24 and the similar spacing member 25, these type molds being pressed together by blocks $23^b$. Thus each series of type molds composing a line will be separated from the type molds in another line by spacing members, all of which are "type high" so that the surface of the bottom plate will be flush throughout, except for the extension of the type and the ornamental piece above the surface of the plate. The ornamental mold part 21, in these views is made in one piece, of any suitable material and has one flat side which rests directly upon the flat surface of the bottom piece. As the bottom piece is composed of a series of type molds with intervening spacing members, it is necessary to compress these members together so that the plastic material will not leak through. Because of this relative movement of the parts in building up the back piece, lost motion connections are required between the ornamental mold part and the parts composing the back piece. Thus one or more adjusting screws 26 extend through the end piece 4 and bear against the board 22 and by these screws the several boards or parts composing the bottom piece will be forced together. The ornamental mold part is molded, preferably in one piece, from suitable material with threaded studs 27 arranged at intervals and projecting from the flat side of said part. The spacing boards or parts 22, 24, 25, etc., in the bottom piece are provided with slots 29 extending transversely thereof and adapted to receive the bolts or studs 27. These slots permit the bolts to pass into the bottom piece in different positions of adjustment of its parts and these parts have counter-sunk openings 30 adapted to receive clamping nuts 31, by tightening which the ornamental mold part may be secured to the bottom piece after the various parts of the latter have been clamped together. It will be understood that access to the nuts 31 is attained by raising the mold by means of the handle or lever $d$.

It will be evident that when the plastic material is placed in the mold and tamped, the ornamental mold part and the type molds will make impressions in the face of the monument. The method of handling the monument after it has been molded and encased by a top cover is the same as that described in connection with the previous figures. When the mold has been removed and taken to the drying room or compartment, the bottom piece with the attached ornamental mold part may be removed by tapping on the laterally projecting ends of the mold part of the bottom piece.

Referring to Figs. 8 and 9, the base plate $a$ and the lever $b$ are the same as in previously described figures, and the frame $c$ is substantially the same. The bottom plate in Figs. 8 and 9 is composed of the two flat parts 32 and 33 which may be considered spacing members, and between these are arranged the separable type molds 34 held in place by said spacing members and by blocks 35 and 36 which fit between the spacing members and against the ends of the series of type molds. The parts 32, 33, 35 and 36 are type-high so that their surfaces are flush with the bodies of the type molds. The ornamental mold part, in this illustration, comprises a raised wreath 37 which encircles the type molds. This wreath has a flat side which rests directly upon the flat surface of the bottom plate and it may be secured permanently to one of the spacing members, as for instance the member 32; but it is adjustably connected to the other spacing member for the reason that when the spacing members are pressed inward to grip the type there is a relative movement between said members requiring a lost motion connection between the monument and at least one of said members. As shown in the drawing, the ornamental wreath is formed with studs 38 which pass through suitable openings in the spacing board 32 and these studs are secured to said board by nuts 39 arranged in countersunk openings in the board 32. Similar studs on the ornamental wreath project into the transverse slots 40 in the spacing board 33 and these studs are secured by nuts 41 countersunk into the board 33. Clamping screws 42 extend through one of the end parts of the mold and bear against the plate 32, and by tightening these screws the parts will be clamped together. The nuts on the studs may then be tightened to secure the ornament in place and prevent its movement when the plastic material is tamped into the mold.

The operation of molding a monument with the mold illustrated in Figs. 8 and 9 is the same as in the previously described figures.

In Fig. 10 the base plate, lever, and side and end boards of the mold are the same as in Fig. 8. The base plate of the mold, however, comprises a block 43 having a central opening 44 which, in this instance, is semi-elliptical. This opening is adapted to receive the separable type molds 45 and also adapted to receive a semi-elliptical spacing member 46 which fits into the opening 44 at one side of the line of type molds, and also spacing members 47 which fit between the ends of the line of type molds and wall of the opening 44. One wall of the opening is straight, as shown at 44ᵃ. The printed characters on the type molds, in this instance, are depressed in the mold, so as to form printed characters in relief on the monument and the block 43 has a continuous ornamental depression 48 to mold a raised ornamental design encircling the printed characters on the monument. The block 43 has a lip or flange 49 which is adapted to project inwardly over the spacing pieces 46 and 47 to prevent the plastic material from passing in between the spacing pieces and said block. The spacing pieces and the separable type molds are inserted in the opening in the block through the rear side of the latter and the spacing pieces abut against the flange 49, as shown in Fig. 11.

An adjusting screw 50 extends through the block 43 and is adapted to bear against the spacing piece 46. When this screw is tightened the line of type molds will be gripped between the spacing piece 46 and the straight wall 44ᵃ of the opening, which wall insures the alinement of the type at the center of the ornament. Other clamping screws 51 extend through the side boards of the mold and through the ornamental mold block 43 to the opening in the latter, and when these screws are tightened they will compress the spacing pieces 47 against the ends of the line of type molds. Thus the type molds and spacing pieces will be firmly held in the block 43. Other spacing boards 52 and 53 are shown between the block 43 and ends of the mold, and adjusting screws 42, extending through one end of the mold against the block 52, are provided for clamping the block 43 between said latter spacing pieces.

The mold shown in Fig. 10 is used in the same way as the previously described figures and no detailed description of its operation is necessary.

It is to be noted that in all of the forms of molds shown, the side pieces of the mold frame rest upon the composite bottom plate, so that the latter need not be an exact size, to fit the frame, and, in practice, the bottom plate projects beyond the side pieces, so that this plate can be readily removed by tapping on the projecting parts.

What I claim is:

1. Means for molding monuments and the like from plastic material comprising a base-plate, a bottom plate having patterns thereon and adapted to rest upon the base-plate, side and end pieces, the former adapted to rest upon the bottom plate, and a lever hinged to the base-plate and extending beneath the bottom plate for rocking the mold to an upright position.

2. Means for molding monuments and the like from plastic material comprising a baseplate, a bottom plate having patterns thereon and adapted to rest upon the base-plate, side and end pieces, the former adapted to rest upon the bottom plate and the latter upon the base-plate, and a lever hinged to the base-plate and extending beneath the bottom plate for rocking the mold to an upright position.

3. Means for molding monuments and the like from plastic material comprising a baseplate, a bottom plate composed of separable type molds, an ornamental mold part and spacing members, said bottom plate adapted to rest upon the base-plate, side and end pieces, the former adapted to rest upon the bottom plate, and a lever hinged to the baseplate and extending beneath the bottom plate for rocking the mold to an upright position.

4. Means for molding monuments and the like from plastic material comprising a baseplate, a bottom plate having patterns thereon and adapted to rest upon the base-plate, side and end pieces, the former adapted to rest upon the bottom plate, and a lever hinged near one of its ends to the base-plate and extending beneath the bottom plate, said lever having a part adjacent its pivotal point projecting above the base-plate and engaging one of the end pieces of the mold.

5. Means for molding monuments and the like from plastic material comprising a baseplate having grooves therein, a bail pivoted at its ends to said plate and adapted to lie in said grooves, the end portions of said bail having projections adapted to extend above the surface of said plate, and a mold having a bottom plate adapted to rest on said base-plate above the bail and having side and end pieces, one of the latter adapted to rest upon said projecting parts of the bail when the latter is swung upwardly.

6. Means for molding monuments and the like from plastic material comprising a base-plate, a composite bottom plate adapted to rest upon the base plate and comprising type-molds, spacing members and an ornamental mold part extending at the sides of the type-molds, and a frame comprising end pieces adapted to rest on the base plate and side pieces, detachably connected to the end pieces and adapted to rest on the bottom plate.

7. Means for molding monuments and the like from plastic material comprising a base plate, a composite bottom plate adapted to rest upon the base plate and comprising type-molds, spacing members and an ornamental mold part extending at the sides of the type-molds, means for clamping the type molds and spacing members together, and means for adjustably securing said molds, members and said ornamental mold part together.

8. Means for molding monuments and the like from plastic material comprising a base plate, a composite bottom plate adapted to rest upon the base plate and comprising type-molds, spacing members and an ornamental mold part extending at the sides of the type-molds and having a lost-motion connection with certain of the spacing members.

9. Means for molding monuments and the like from plastic material comprising a base plate, a composite bottom plate adapted to rest upon the base plate and comprising type-molds, spacing members and an ornamental mold part extending at the sides of the type molds, and adjusting screws extending through the ornamental mold part and adapted to clamp the type molds and spacing members thereto.

In testimony whereof I hereunto affix my signature.

JOSEPH E. COCHRAN.